(12) United States Patent
Hornung et al.

(10) Patent No.: US 11,429,480 B2
(45) Date of Patent: Aug. 30, 2022

(54) METHOD OF DEMAND SCRUBBING BY PLACING CORRECTED DATA IN MEMORY-SIDE CACHE

(71) Applicant: Micron Technology, Inc., Boise, ID (US)

(72) Inventors: Bryan Hornung, Plano, TX (US); David Patrick, McKinney, TX (US)

(73) Assignee: Micron Technology, Inc., Boise, ID (US)

( * ) Notice: Subject to any disclaimer, the term of this patent is extended or adjusted under 35 U.S.C. 154(b) by 67 days.

(21) Appl. No.: 17/007,811

(22) Filed: Aug. 31, 2020

(65) Prior Publication Data

US 2022/0066869 A1 Mar. 3, 2022

(51) Int. Cl.
*G06F 11/10* (2006.01)
*G06F 11/30* (2006.01)
(Continued)

(52) U.S. Cl.
CPC ........ *G06F 11/1068* (2013.01); *G06F 11/106* (2013.01); *G06F 11/3037* (2013.01);
(Continued)

(58) Field of Classification Search
CPC ............... G06F 11/1068; G06F 11/106; G06F 11/3037; G06F 12/0246; G06F 13/1668; G06F 2212/7209
See application file for complete search history.

(56) References Cited

U.S. PATENT DOCUMENTS

| 7,437,597 B1 | 10/2008 | Kruckemyer et al. |
| 2010/0228922 A1 | 9/2010 | Limaye |

(Continued)

FOREIGN PATENT DOCUMENTS

| KR | 20130047578 A | 5/2013 |
| WO | WO-2022046285 A1 | 3/2022 |

OTHER PUBLICATIONS

"International Application Serial No. PCT/US2021/039814, International Search Report dated Oct. 22, 2021", 3 pgs.
(Continued)

*Primary Examiner* — Guy J Lamarre
(74) *Attorney, Agent, or Firm* — Schwegman Lundberg & Woessner, P.A.

(57) ABSTRACT

Systems, apparatuses, and methods related to chiplets are described. A chiplet-based system may include a memory controller chiplet to control accesses to a storage array, and the memory controller chiplet can facilitate error correction and cache management in a manner to minimize interruptions to a sequence of data reads to write corrected data from a prior read back into the storage array. For example, a read command may be received at a memory controller device of the memory system from a requesting device. Data responsive to the read command may be obtained and determined to include a correctable error. The data may be corrected, transmitted to the requesting device and written to cache of the memory controller device with an indication that data is valid and dirty (e.g., includes an error or corrected error). The data is written back to the memory array in response to a cache eviction event.

20 Claims, 4 Drawing Sheets

(51) Int. Cl.
  *G06F 12/02* (2006.01)
  *G06F 13/16* (2006.01)
  *G06F 12/0891* (2016.01)

(52) U.S. Cl.
  CPC ...... *G06F 12/0246* (2013.01); *G06F 12/0891* (2013.01); *G06F 13/1668* (2013.01); *G06F 2212/7209* (2013.01)

(56) References Cited

U.S. PATENT DOCUMENTS

| | | |
|---|---|---|
| 2011/0078492 A1 | 3/2011 | Kumar et al. |
| 2012/0221774 A1* | 8/2012 | Atkisson ............. G06F 12/0895 711/103 |
| 2014/0173379 A1 | 6/2014 | Loh et al. |
| 2021/0026686 A1* | 1/2021 | Sakharshete ........... G06N 3/063 |

OTHER PUBLICATIONS

"International Application Serial No. PCT/US2021/039814, Written Opinion dated Oct. 22, 2021", 4 pgs.

\* cited by examiner

METHOD OF DEMAND SCRUBBING BY PLACING CORRECTED DATA IN MEMORY-SIDE CACHE

STATEMENT REGARDING GOVERNMENT SUPPORT

This invention was made with U.S. Government support under Agreement No. HR00111830003, awarded by DARPA. The U.S. Government has certain rights in the invention.

TECHNICAL FIELD

Embodiments of the disclosure relate generally to chiplet-based systems, and more specifically to systems and methods to operate a memory controller as may be implemented in one or more chiplets of a chiplet-based system.

BACKGROUND

Chiplets are an emerging technique for integrating various processing functionality. Generally, a chiplet system is made up of discreet chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discreetly packaged devices integrated on a board. In general, chiplets provide better performance (e.g., lower power consumption, reduced latency, etc.) than discreetly packaged devices, and chiplets provide greater production benefits than single die chips. These production benefits can include higher yields or reduced development costs and time.

Chiplet systems are generally made up of one or more application chiplets and support chiplets. Here, the distinction between application and support chiplets is simply a reference to the likely design scenarios for the chiplet system. Thus, for example, a synthetic vision chiplet system can include an application chiplet to produce the synthetic vision output along with support chiplets, such as a memory controller chiplet, sensor interface chiplet, or communication chiplet. In an example use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those using different feature sizes. Thus, for example, devices designed during a previous fabrication generation with larger feature sizes, or those devices in which the feature size is optimized for the power, speed, or heat generation (e.g., for sensor applications) can be integrated with devices having different feature sizes more easily than attempting to do so on a single die. Additionally, by reducing the overall size of the die, the yield for chiplets tends to be higher than that of more complex, single die devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Embodiments of the present disclosure are directed to initializing electronic systems that include chiplets. A chiplet-based system may include chiplets that each perform a different function, or the system may include multiple chiplets that perform the same function, but with the multiple chiplets configured together (e.g., to implement parallelism in performing the function) to provide a higher performance solution. An example chiplet-based system may include a memory controller chiplet to control accesses to a storage array. To provide high-performance in terms of memory accesses through the use of the memory controller chiplet, the memory controller chiplet can be configured in accordance with the current description to facilitate error correction and cache management in a manner to minimize the need to interrupt a sequence of data reads to write corrected data from a prior read back into the storage array.

Figure 1A:
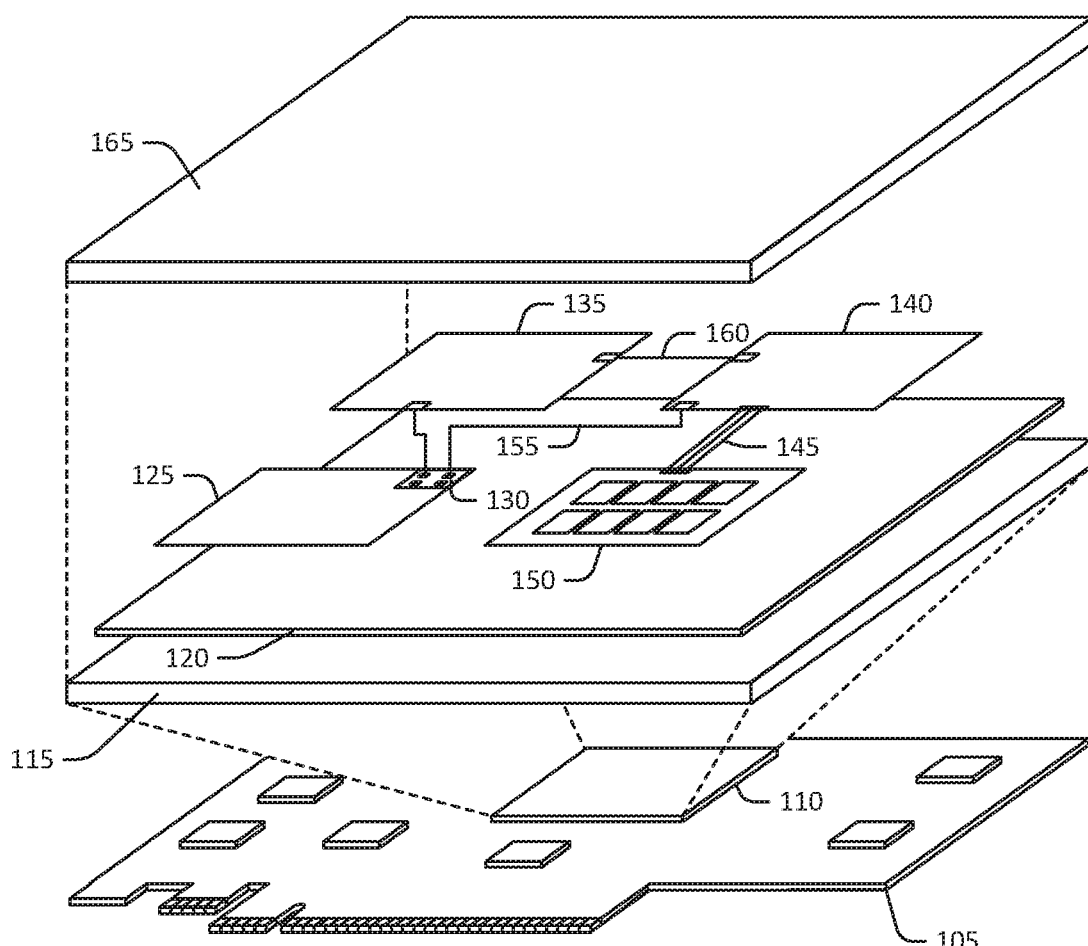
FIGS. 1A-1B illustrate an example of a chiplet system, in accordance with some examples described herein.
Figure 1B:
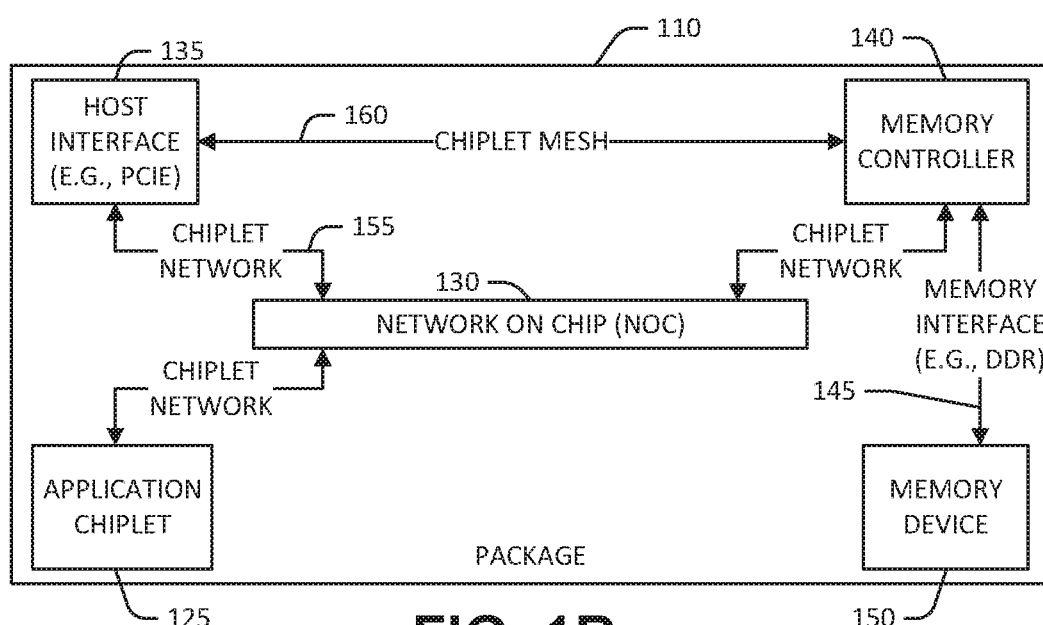

FIGS. 1A and 1B illustrate an example of a chiplet system 110. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets; an application chiplet 125, a host interface chiplet 135, a memory controller chiplet 140, and a memory device chiplet 150. The package of the chiplet system 110 is illustrated with a lid 165, though other covering techniques for the package can be used. FIG. 1B is a block diagram labeling the components in the chiplet system for clarity.

The application chiplet 125 is illustrated as including a network-on-chip (NOC) 130 to support an inter-chiplet communications network, or chiplet network 155. The NOC 130 is generally included on the application chiplet 125 because it is usually created after the support chiplets (e.g., chiplets 135, 140, and 150) are selected, thus enabling a designer to select an appropriate number of chiplet network connections or switches for the NOC 130. In an example, the NOC 130 can be located on a separate chiplet, or even within the interposer 120. In an example, the NOC 130 implements a chiplet protocol interface (CPI) network.

A CPI network is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. To achieve the flexibility of the chiplet system, CPI is used as an adapter to interface between the various AXI design options (or non-AXI communication protocols) that can be used across the various chiplets. By enabling a physical channel to virtual channel mapping and encapsulating time-based signaling with a packetized protocol, CPI successfully bridges intra-chiplet networks across the chiplet network 155.

CPI can use a variety of different physical layers to transmit packets. The physical layer can include simple conductive connections or include drivers to transmit the signals over longer distances or drive greater loads. An example of one such physical layer can include the Advanced Interface Bus (AIB), implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The AIB channel can act as an AIB master or slave depending on which chiplet provides the master clock. AIB I/O cells support three clocking modes: asynchronous (i.e. non-clocked), SDR, and DDR. The non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half RX and half RX. CPI packet protocols can use an AIB channel in either SDR or DDR operation modes. In an example, the AIB channel is configurable in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The interface identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary (AUX) channel that can be used for out-of-band signaling. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

In general, CPI interfaces of individual chiplets can include serialization-deserialization (SERDES) hardware. SERDES interconnects work well for scenarios in which high-speed signaling with low signal count are desirable. However, SERDES can result in additional power consumption and longer latencies for multiplexing and demultiplexing, error detection or correction (e.g., using block level cyclic redundancy checking (CRC)), link-level retry, or forward error correction. For ultra-short reach chiplet-to-chiplet interconnects where low latency or energy consumption is a primary concern, a parallel interface with clock rates that allow data transfer with minimal latency can be a better solution. CPI includes elements to minimize both latency and energy consumption in these ultra-short reach chiplet interconnects.

For flow control, CPI employs a credit-based technique. A CPI recipient, such as the application chiplet 125, provides a CPI sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the CPI recipient has twenty buffers arranged in five rows. Each buffer is sized to hold the payload of one CPI packet.

When the CPI sender transmits to the CPI recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender to transmit additional information.

Also illustrated in FIGS. 1A and 1B is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as the memory interface 145, can also be used to interconnect chiplets, or to connect chiplets to external devices; such as the host interface chiplet 135 providing a PCIE interface external to the board 105 for the application chiplet 125. Such dedicated interfaces 145 are generally used when a convention or standard in the industry has converged on such an interface. The illustrated example of a Double Data Rate (DDR) interface 145 connecting the memory controller chiplet 140 to a dynamic random access memory (DRAM) memory device chiplet 150 is an example of such an industry convention.

Of the variety of possible support chiplets, the memory controller chiplet 140 is likely present in the chiplet system 110 due to the near omnipresent use of storage for computer processing as well as a sophisticated state-of-the-art for memories. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. Maintenance operations tend to be specific to the memory device chiplet 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data.

Atomic operations are a data manipulation performed by the memory controller chiplet 140. For example, an atomic operation of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the command's success to the application chiplet 125. Atomic operations avoid transmitting the data across the chiplet network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 140. An example of a memory controller chiplet 140 implementing a PAU is described in regard to FIG. 2.

The memory device chiplet 150 can be, or can include, any combination of volatile memory devices or non-volatile memories. Examples of volatile memory devices include, but are not limited to, random access memory (RAM), dynamic RAM (DRAM), synchronous DRAM (SDRAM), and graphics double data rate type 6 SDRAM (GDDR6 SDRAM). Examples of non-volatile memory devices include, but are not limited to, negative-and-(NAND)-type flash memory, storage class memory (e.g., phase-change memory or memristor based technologies), and ferroelectric RAM (FeRAM). The illustrated example of FIGS. 1A and 1B includes the memory device 150 as a chiplet, however, the memory device 150 can reside elsewhere, such as in a different package on the board 105.

Figure 2:
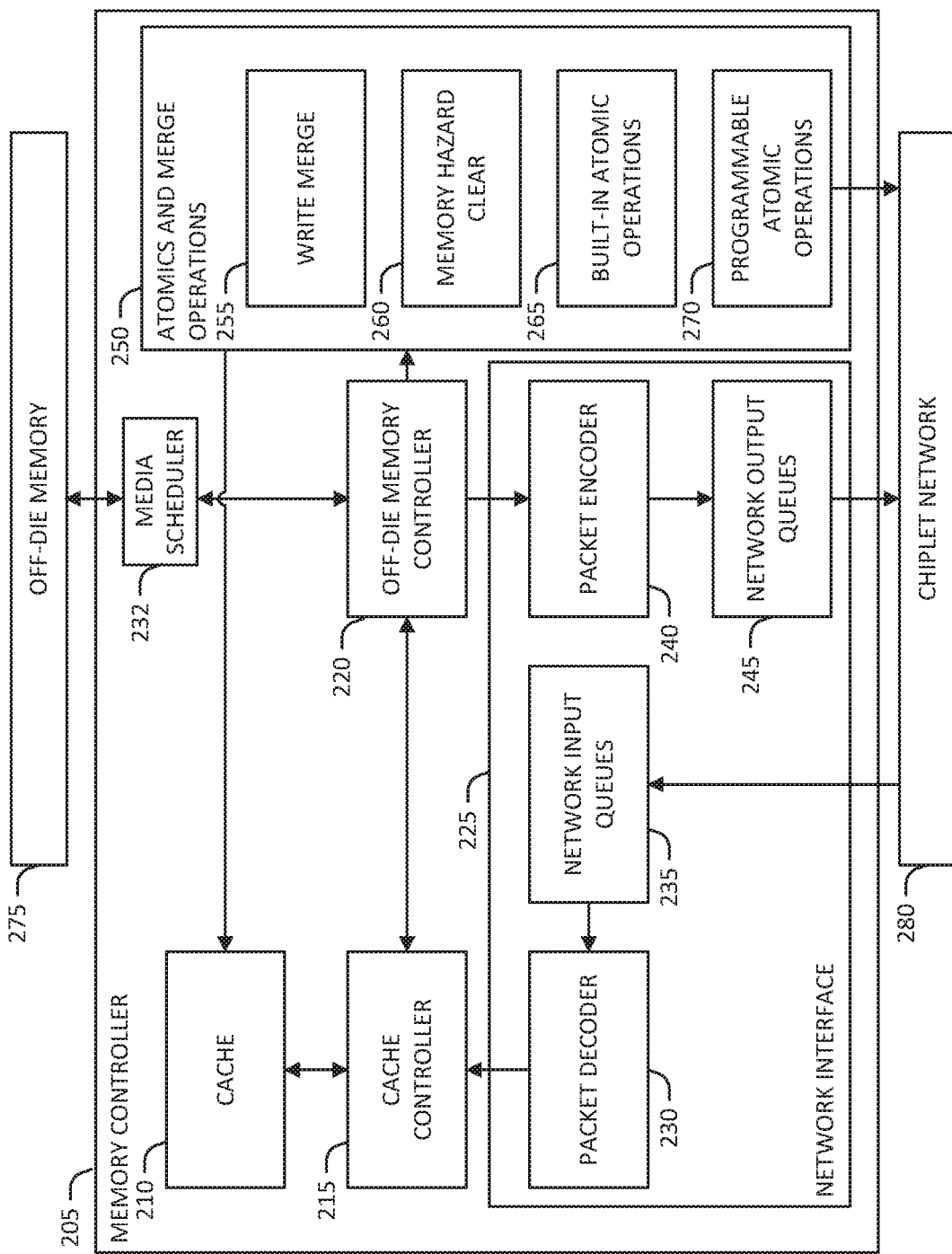
FIG. 2 is a block diagram of an example of a memory controller chiplet, in accordance with some examples described herein.

FIG. 2 illustrates components of an example of a memory controller chiplet 205, according to an embodiment. The memory controller chiplet 205 includes a cache memory or cache 210, a cache controller 215, an off-die memory controller 220 (e.g., to communicate with off-die memory 275), a network communication interface 225 (e.g., to interface with a chiplet network 280 and communicate with other chiplets), and a set of atomic and merge operations 250. Members of this set can include a write merge unit 255, a hazard unit (260), built-in atomic unit 265, or a PAU 270. The various components are illustrated logically, and not as they necessarily would be implemented. For example, the built-in atomic unit 265 likely comprises different devices along a path to the off-die memory. In contrast, the programmable atomic operations 270 are likely implemented in a separate processor on the memory controller chiplet 205.

The off-die memory controller 220 is directly coupled to the off-die memory 275 (e.g., via a bus or other communication connection) to provide write operations and read operations to and from the off-die memory 275. The off-die memory includes a memory array containing memory cells. The off-die memory may be one or more memory die or a memory device chiplet. The off-die memory controller 220 is also coupled for output to the atomic and merge operations unit 250, and for input to the cache controller 215.

The cache controller 215 is directly coupled to the cache 210, and also coupled to the network communication interface 225 for input (such as incoming read or write requests) and to the off-die memory controller 220 for output.

The network communication interface 225 includes a packet decoder 230, network input queues 235, a packet encoder 240, and network output queues 245 to support a packet-based chiplet network 280 (e.g., a CPI network). The chiplet network 280 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 280 can be implemented as a collection of crossbar switches having a folded clos configuration, or a mesh network providing for additional connections, depending upon the configuration. The chiplet network 280 can be part of an asynchronous switching fabric. In this example, a data packet can be routed along any of various paths, such that the arrival of any selected data packet at an addressed destination can occur at any of a plurality of different times, depending upon the routing. The chiplet network 280 can be implemented as a synchronous communication network, such as a synchronous mesh communication network. Any and all such communication networks are considered equivalent and within the scope of the disclosure.

The memory controller chiplet 205 can receive a packet having a source address, a read request, and a physical address. In response, the off-die memory controller 220 or the cache controller 215 will read the data from the specified physical address (which can be in the off-die memory 275 or in the cache 210) and assemble a response packet to the source address containing the requested data. Similarly, the memory controller chiplet 205 can receive a packet having a source address, a write request, and a physical address. In response, the memory controller chiplet 205 will write the data to the specified physical address (which can be in the off-die memory 275 or in the cache 210) and assemble a response packet to the source address containing an acknowledgement that the data was stored to a memory.

Thus, the memory controller chiplet 205 can receive read and write requests via the chiplet network 280 and process the requests using the cache controller 215 interfacing with the cache 210. If the request cannot be handled by the cache controller 215, the off-die memory controller 220 handles the request by communication with the off-die memory 275, by the atomic and merge operations 250, or by both. Data read by the off-die memory controller 220 can be stored in the cache 210 by the cache controller 215 for later use.

The atomic and merge operations 250 are coupled to receive (as input) the output of the off-die memory controller 220, and to provide output to the cache 210, the network communication interface 225, or directly to the chiplet network 280. The memory hazard clear (reset) unit 260, write merge unit 265 and the built-in (e.g., predetermined) atomic operations unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 280.

When the request data is for a built-in atomic operation, the built-in atomic operations unit 265 receives the request and read data, either from the write merge unit 265 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 280.

The built-in atomic operations unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 280. The request packet has a physical address, atomic operator type, operand size, and optionally up to 32-bytes of data. The atomic operation performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as a comparatively simple, single cycle, integer atomics (e.g., fetch-and-increment or compare-and-swap), which will occur with the same throughput as a regular memory read or write operation not involving an atomic operation. For these operations, the cache controller 215 generally reserves a cache line in the cache 210 by setting a hazard bit (in hardware), so that the cache line cannot be read by another process while it is in transition. The data is obtained from either the off-die memory 275 or the cache 210, and is provided to the built-in atomic operation unit 265 to perform the requested atomic operation. Following the atomic operation, in addition to providing the resulting data to the data packet encoder 240 to encode outgoing data packets for transmission on the chiplet network 280, the built-in atomic operation unit 265 provides the resulting data to the write merge unit 255, which will also write the resulting data to the cache circuit 210. Following the writing of the resulting data to the cache 210, any corresponding hazard bit which was set will be cleared by the memory hazard clear unit 260.

The PAU 270 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation, to ensure that no other operation (read, write, or atomic) is performed on that memory line. The hazard bit is then cleared upon completion of the atomic operation. Additional direct data paths provided for the PAU 270 to execute the programmable atomic operations allow for additional write operations without any limitations imposed by the bandwidth of the communication networks and without increasing any congestion of the communication networks.

The PAU 270 include a RISC-V instruction set architecture (RISC-V ISA) based multi-threaded processor having one or more processor cores, and may further have an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 that involve requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the off-die memory 275 or the cache 210, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 280. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

The approach taken for programmable atomic operations is to provide multiple, generic, custom atomic request types that can be sent through the chiplet network 280 to the memory controller chiplet 205 from an originating source such as a processor or other system component. The cache controller 215 and off-die memory controller 220 identify the request as a custom atomic request and forward the request to the PAU 270. In a representative embodiment, the PAU 270: (1) is a programmable processing element capable of efficiently performing a user defined atomic operation; (2) can perform load and stores to memory, arithmetic and logical operations and control flow decisions; and (3) can leverage the RISC-V ISA with a set of new, specialized instructions to facilitate interacting with the cache and off-die controllers 215, 220 to atomically perform the user-defined operation. It should be noted that the RISC-V ISA contains a full set of instructions that support high level language operators and data types. The PAU 270 can leverage the RISC-V ISA, but generally supports a more limited set of instructions and limited register file size to reduce the die size of the unit when included within the memory controller chiplet 205.

As mentioned above, any hazard bit which is set will be cleared by the memory hazard clear unit 260. Prior to the writing of the read data to the cache 210, a set hazard bit for the reserved cache line is to be cleared by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
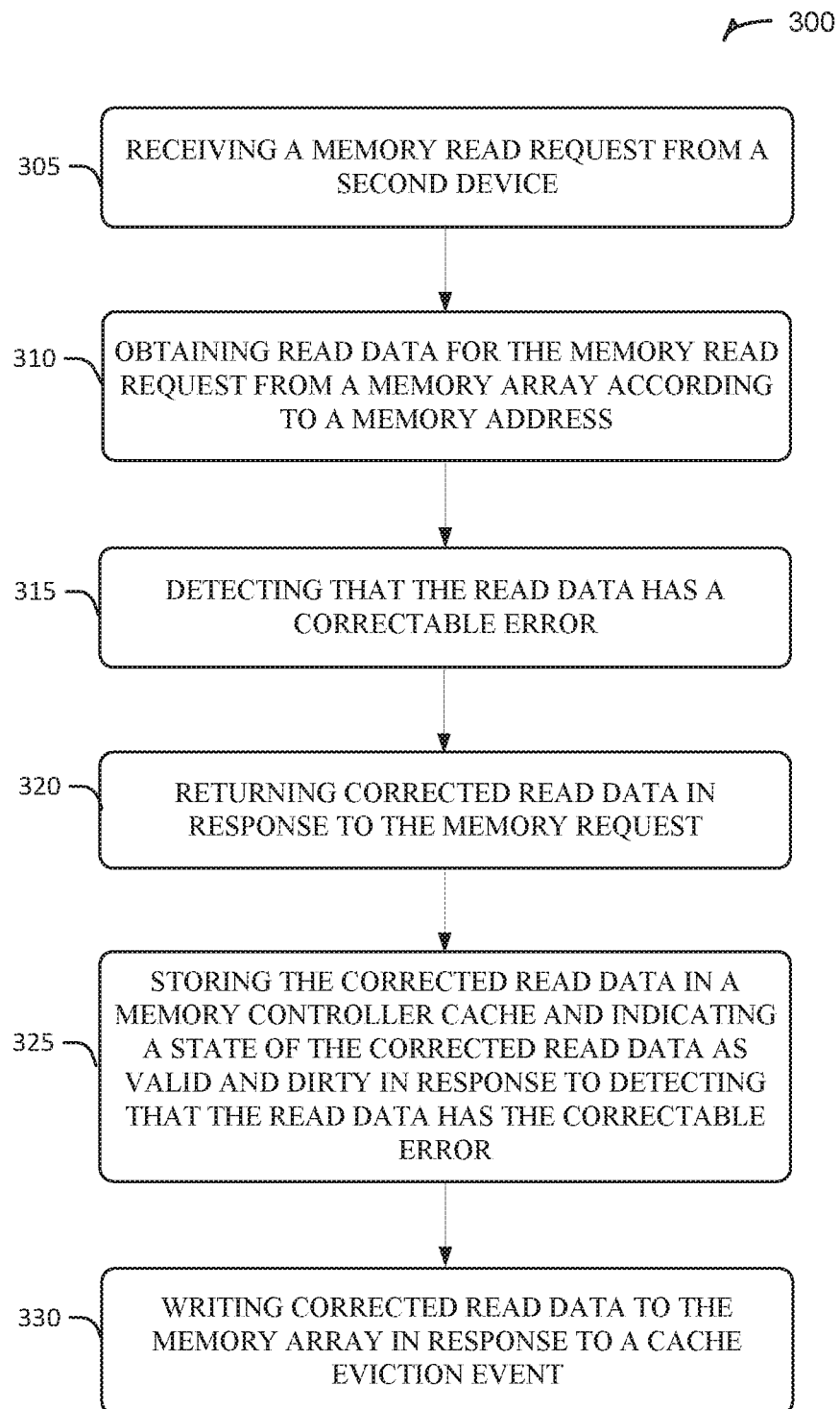
FIG. 3 is a flow diagram of a method of operating a memory controller chiplet, in accordance with some examples described herein.

FIG. 3 is a flow diagram of an example of a method of operating a memory system, such as a memory system including the memory controller chiplet 205 and the off-die memory 275 of FIG. 2. The off-die memory 275 may include memory die (e.g., NAND memory die) or a memory device chiplet. At 305, a memory read request is received by the memory controller chiplet 205 from a second device. The second device may be another chiplet such as the application chiplet or host interface chiplet of the example of FIG. 1. The memory read request includes a memory address, and the memory read request is decoded by the memory controller. In response to the memory read request, the memory controller obtains the requested read data from the memory controller cache 210 or from a memory array included in the off-die memory 275.

When the memory controller receives and decodes the memory read request, it queries the memory controller cache 210 to check whether the requested data is stored in the memory controller cache 210. If the requested data is not stored in the memory controller cache 210, the cache controller 215 allocates a cache line for the read data and indicates that the state of the cache line is invalid.

At 310 in FIG. 3, because the read data is not in the memory controller cache 210, read data for the memory read request is fetched from the memory array in the off-die memory 275 according to the memory address. The off-die memory controller 220 sends the read request to the media scheduler 232. The media scheduler 232 sends a request for the read data to the memory array via a memory array bus included in the interface to the off-die memory 275.

The memory read operation provides error correction. The memory controller may use error correction code (ECC) to detect and correct errors. The error correction code may be stored with the data in the memory array or stored separate from the data. The error correction code may have been generated by the memory controller using ECC circuitry when the write data was received from the second device or may have been provided with data written into the memory array during a write operation.

If the error correction code is stored with the data, only one read request is sent. If the error correction code is not stored with the data, two separate requests are sent, one request for the data stored at a first memory address, and a second request for the error correction code stored at a different memory address. The media scheduler 232 finds a time slot for the read request on the memory array bus and the request is sent to the memory array.

The off-die memory may include one or more NAND die, and the memory array may be a NAND flash memory array. The memory array bus may be a NAND flash bus using a double data rate (DDR) interface. The memory controller chiplet 205 may include physical layer circuitry that sends commands to the memory array, and sends write data and receives the read data using the memory array bus.

The read data and the error correction code are received from the memory array and provided to the media scheduler 232. The media scheduler 232 returns the data and error correction code to the memory controller cache 210. The memory controller cache 210 uses the data and the error correction code to check for a correctable error in the read data. The memory controller cache 210 may include the error correction circuitry to correct the errors or the error correction circuitry may be separate from the memory controller cache 210. If no error is found in the read data, the data is stored in the memory controller cache 210 and allocated the cache line generated previously for the data. The state of the cache line is changed to valid.

Returning to FIG. 3, at 315 the memory controller detects that the read data includes a correctable data error. At 320, the memory controller returns corrected read data to the requesting second device in response to the memory request.

At 325, the memory controller stores the corrected read data in the memory controller cache. State information of the data stored in the cache is also stored. The state of the corrected data in the memory controller cache is designated by the cache controller 215 as valid and dirty to indicate that the data in cache is different from the data in the memory array. It should be noted that the dirty state or dirty flag is set as part of a read operation. Normally, a dirty flag is only used in write operations to signal to other processors that write data was received from a processor and the data in cache is modified from the copy in main memory. The dirty flag is not used during read operations. In the present example, only off-die memory controller 220 is accessing the off-die memory devices, thus the system is fully coherent, and the dirty flag may be used for an additional purpose—to facilitate deferral of correcting data in the memory array (off-die memory 275) with the corrected data previous written in memory controller cache 210.

At 330, sometime in the future the corrected read data is written to the memory array in response to a cache eviction event to correct errors in the memory array. The memory controller will write the data in the cache indicated by the dirty flag and the error correction codes derived from the data into the memory array. The data may be written in response to a cache event, such as a capacity eviction, flush operation, eviction maintenance request or other cache operation that results in an eviction.

In some examples, the data may be written back to the memory as part of a demand scrubbing operation. To implement the demand scrubbing operation, the data can be written using the paths used in normal write operations without the need for a read-modify-write path, and the write operations for the demand scrubbing can be scheduled with other write operations. By using the memory controller cache, the path from the memory controller to the memory array is simpler. Also, the media scheduler does not have to implement the data correction.

Figure 4:
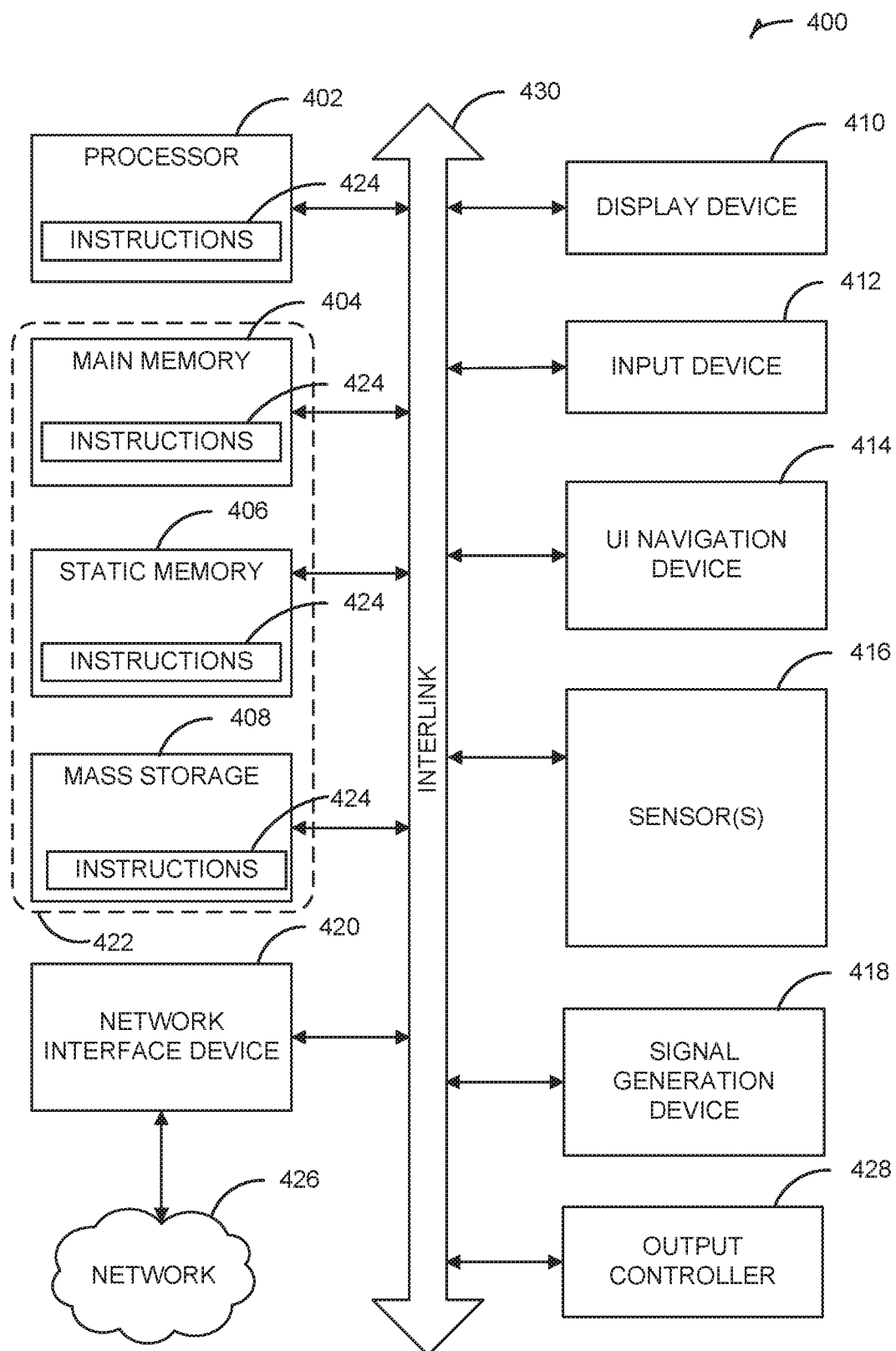
FIG. 4 illustrates a block diagram of an example machine, in accordance with some examples described herein.

FIG. 4 illustrates a block diagram of an example machine 400 upon which any one or more of the techniques (e.g., methodologies) discussed herein may perform, such as the described discard and purge operations for example. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The embodiments and examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 400 (e.g., the chiplet-based system of FIG. 1, etc.) may include a processing device 402 (e.g., a hardware processor, a central processing unit (CPU), a graphics processing unit (GPU), a hardware processor core, or any combination thereof, such as a memory control unit of the memory device 110, etc.), a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a data storage system 418, some or all of which may communicate with each other via an interlink (e.g., bus) 430.

The processing device 402 can represent one or more general-purpose processing devices such as a microprocessor, a central processing unit, or the like. More particularly, the processing device 402 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 can be configured to execute instructions 426 for performing the operations and steps discussed herein. The machine 400 can further include a network interface device 408 to communicate over a network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 or within the processing device 402 during execution thereof by the machine 400, the main memory 404 and the processing device 402 also constituting machine-readable storage media. The machine-readable storage medium 424, the data storage system 418, or the main memory 504 can correspond to the off-die memory 150 of FIG. 1. In one implementation, the instructions 426 include instructions 411 to implement functionality corresponding to writing error corrected data from a memory controller cache to the storage media as part of a demand scrubbing operation.

While the machine-readable storage medium 424 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 400 may further include a display unit, an alphanumeric input device (e.g., a keyboard), and a user interface (UI) navigation device (e.g., a mouse). In an example, one or more of the display unit, the input device, or the UI navigation device may be a touch screen display. The machine may include a signal generation device (e.g., a speaker), or one or more sensors, such as a global positioning system (GPS) sensor, compass, accelerometer, or one or more other sensor. The machine 400 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 426 (e.g., software, programs, an operating system (OS), etc.) or other data are stored on the data storage device 418 can be accessed by the main memory 404 for use by the processing device 402. The main memory 404 (e.g., DRAM) is typically fast, but volatile, and thus a different type of storage than the data storage device 418 (e.g., an SSD), which is suitable for long-term storage, including while in an "off" condition. The instructions 426 or data in use by a user or the machine 400 are typically loaded in the main memory 404 for use by the processing device 402. When the main memory 404 is full, virtual space from the data storage device 418 can be allocated to supplement the main memory 404; however, because the data storage device 418 device is typically slower than the main memory 404, and write speeds are typically at least twice as slow as read speeds, use of virtual memory can greatly reduce user experience due to storage device latency (in contrast to the main memory 404, e.g., DRAM). Further, use of the data storage device 418 for virtual memory can greatly reduce the usable lifespan of the data storage device 418.

In contrast to virtual memory, virtual memory compression (e.g., the Linux™ kernel feature "ZRAM") uses part of the memory as compressed block storage to avoid paging to the data storage device 418. Paging takes place in the compressed block until it is necessary to write such data to the data storage device 418. Virtual memory compression increases the usable size of the main memory 404, while reducing wear on the data storage device 418.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 424 may further be transmitted or received over a network 420 using a transmission medium via the network interface device 408 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 408 may include one or more physical jacks (e.g., Ethernet, coaxial, or phone jacks) or one or more antennas to connect to the network 420. In an example, the network interface device 408 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software. A transmission medium is a machine readable medium.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, unless stated otherwise the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to selectively reduce the operating rate of one or more components to reduce active power. The memory device control circuitry (e.g., control logic) may be programmed to slow the clock signal provided to the components in response to determining the type of memory accesses (e.g., memory usage patterns) that are being performed by the memory access device.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

Example 1 includes subject matter (such as a memory system) comprising a memory array including memory cells and a memory controller operatively coupled to the memory array and including a memory controller cache. The memory controller is configured to decode a memory read request from the host device, obtain read data for the memory read request from a memory array of the memory device according to a memory address, detect that the read data has a correctable error, return corrected read data to the host device in response to the memory request, store the corrected read data in the memory controller cache and indicate a state of the corrected read data as valid and dirty in response to detecting that the read data has the correctable error, and determine a cache eviction event and write corrected read data to the memory array in response to the cache eviction event.

In Example 2, the subject matter of Example 1 optionally includes a memory controller is configured to query the memory controller cache in response to the memory read request, allocate a cache line for the read data in response to determining that requested read data is not stored in the memory controller cache and indicate a state of the cache line as invalid, and change the state of the cache line to valid and dirty in response to detecting that the read data has the correctable error.

In Example 3, the subject matter of one or both of Examples 1 and 2 optionally includes a memory controller configured to write the corrected read data to the memory array during a demand scrub operation to correct errors in data stored in the memory array.

In Example 4, the subject matter of one or any combination of Examples 1-3 optionally includes a media scheduler configured to send a request for the read data to the memory array via a memory array bus, receive the read data and a stored error correction code for the read data from the memory array via the memory array bus, and send the received read data and error correction code to the memory controller cache. The memory controller is configured to determine that the read data includes the correctable error using the error correction code.

In Example 5, the subject matter of Example 4 optionally includes a memory controller configured to send a separate request for the stored error correction code to the memory array via the memory array bus.

In Example 6, the subject matter of one or both of Examples 4 and 5 optionally includes a memory controller is configured to store the error correction code for the requested read data at a different address of the memory array than the read data.

In Example 7, the subject matter of one or any combination of Examples 4-6 optionally includes a memory controller cache including error correction circuitry to correct the error in the read data.

In Example 8, the subject matter of one or any combination of Examples 1-7 optionally includes a memory controller included in a first chiplet of the memory system and a memory array included in a second chiplet of the memory system.

In Example 9, the subject matter of Example 8 optionally includes a memory array that is a NAND flash memory array, and the memory system further includes a Double Data Rate (DDR) interface coupled to the memory controller to access the NAND flash memory array.

Example 10 includes subject matter (such as a method of operating a memory system) or can optionally be combined with one or any combination of Examples 1-9 to include such subject matter, comprising receiving a read command at a memory controller device of the memory system from a second device, obtaining data responsive to the read command from a memory array of the memory system according to a memory address and associated with the read command; detecting that the data has a correctable error; transmitting corrected data to the second device in response to the read command; writing the corrected data in a cache of the memory controller device and indicating a state of the corrected data as valid and dirty in response to detecting that the data has the correctable error; and writing the corrected data from the cache to the memory array in response to a cache eviction event.

In Example 11, the subject matter of Example 10 optionally includes querying the cache of the memory controller device in response to the read command, allocating a cache line for the read data in response to determining that requested read data is not stored in the memory controller cache and indicating a state of the cache line as invalid, and changing the state of the cache line to valid and dirty in response to detecting that the read data has the correctable error.

In Example 12, the subject matter of one or both of Examples 10 and 11 optionally includes writing the corrected read data to the memory array during a demand scrub operation to correct data errors in the memory array.

In Example 13, the subject matter of one or any combination of Examples 10-12 optionally includes sending the read command to a media scheduler of the memory system; sending, by the media scheduler, a request for the data responsive to the read command during an available time slot via a memory array bus; receiving, by the media scheduler, the data and a stored error correction code for the data from the memory array via the memory array bus; sending, by the media scheduler, the received data and error correction code to the memory controller cache; and determining, by the memory controller cache, that the data includes the correctable error using the error correction code.

In Example 14, the subject matter of Example 13 optionally includes sending the read command and sending a separate request for the stored error correction code to the memory array via the memory array bus.

In Example 15, the subject matter of one or any combination of Examples 10-14 optionally includes storing error correction code for data stored in the memory array at a different address than the data.

Example 16 includes subject matter or can optionally be combined with one or any combination of Examples 1-15 to include such subject matter, such as a computer readable storage medium comprising instructions configured to cause a memory controller of a memory system to decode a memory read request from a requesting device, obtain read data for the memory read request from a memory array of the memory system according to a memory address, detect that the read data has a correctable error, return corrected read data to the requesting device in response to the memory request, store the corrected read data in a memory controller cache of the memory system and indicate a state of the corrected read data as valid and dirty in response to detecting that the read data has the correctable error, and determine a cache eviction event and write corrected read data to the memory array in response to the cache eviction event.

In Example 17, the subject matter of Example 16 optionally includes instructions to cause the memory controller to query the memory controller cache in response to the memory read request, allocate a cache line for the read data when the requested read data is not stored in the memory controller cache and indicate a state of the cache line as invalid, and change the state of the cache line to valid and dirty in response to detecting that the read data has the correctable error.

In Example 18, the subject matter of one or both of Examples 16 and 17 optionally includes instructions to cause the memory controller to write the corrected read data to the memory array during a demand scrub operation that corrects data errors in the memory array.

In Example 19, the subject matter of one or any combination of Examples 16-18 optionally includes instructions to send the memory read request to a media scheduler of the memory system, send a request for the read data during an available time slot via a memory array bus, receive the read data and a stored error correction code for the read data from the memory array via the memory array bus, send the received read data and error correction code to the memory controller cache, and determine that the read data includes the correctable error using the error correction code.

In Example 20, the subject matter of Example 19 optionally includes instructions to send a separate request via the memory array bus to a separate address of the memory array for the stored error correction code.

These non-limiting Examples can be combined in any permutation or combination.

The invention claimed is:

1. A memory system comprising:
a memory array including memory cells; and
a memory controller operatively coupled to the memory array and including a memory controller cache, wherein the memory controller includes processing circuitry, and is configured to:
decode a memory read request from the host device;
obtain read data for the memory read request from a memory array of the memory device according to a memory address;
detect that the read data has a correctable error;
return corrected read data to the host device in response to the memory request;
store the corrected read data in the memory controller cache and indicate a state of the corrected read data as valid and dirty in response to detecting that the read data has the correctable error; and
determine a cache eviction event and write corrected read data to the memory array in response to the cache eviction event.

2. The memory system of claim 1, wherein the memory controller is configured to:
query the memory controller cache in response to the memory read request;
allocate a cache line for the read data in response to determining that requested read data is not stored in the memory controller cache and indicate a state of the cache line as invalid; and
change the state of the cache line to valid and dirty in response to detecting that the read data has the correctable error.

3. The memory system of claim 1, wherein the memory controller is configured to write the corrected read data to the memory array during a demand scrub operation to correct errors in data stored in the memory array.

4. The memory system of claim 1, including:
a media scheduler configured to:
send a request for the read data to the memory array via a memory array bus;
receive the read data and a stored error correction code for the read data from the memory array via the memory array bus; and
send the received read data and error correction code to the memory controller cache; and
wherein the memory controller cache is configured to determine that the read data includes the correctable error using the error correction code.

5. The memory system of claim 4, wherein the memory controller is configured to send a separate request for the stored error correction code to the memory array via the memory array bus.

6. The memory system of claim 4, wherein the memory controller is configured to store the error correction code for the requested read data at a different address of the memory array than the read data.

7. The memory system of claim 4, wherein the memory controller cache includes error correction circuitry to correct the error in the read data.

8. The memory system of claim 1, wherein the memory controller is included in a first chiplet of the memory system and the memory array is included in a second chiplet of the memory system.

9. The memory system of claim 8, wherein the memory array is a NAND flash memory array, and the memory system further includes a Double Data Rate (DDR) interface coupled to the memory controller to access the NAND flash memory array.

10. A method of operating a memory system, the method comprising:
receiving a read command at a memory controller device of the memory system from a second device;
obtaining data responsive to the read command from a memory array of the memory system according to a memory address and associated with the read command;
detecting that the data has a correctable error;
transmitting corrected data to the second device in response to the read command;
writing the corrected data in a cache of the memory controller device and indicating a state of the corrected data as valid and dirty in response to detecting that the data has the correctable error; and
writing the corrected data from the cache to the memory array in response to a cache eviction event.

11. The method of claim 10, further comprising:
querying the cache of the memory controller device in response to the read command; and
allocating a cache line for the data responsive to the read command in response to determining that requested data is not stored in the cache of the memory controller device and indicating a state of the cache line as invalid; and
changing the state of the cache line to valid and dirty in response to detecting that the data has the correctable error.

12. The method of claim 10, wherein writing the corrected data includes writing the corrected data to the memory array during a demand scrub operation to correct data errors in the memory array.

13. The method of claim 10, further comprising:
sending the read command to a media scheduler of the memory system;
sending, by the media scheduler, a request for the data responsive to the read command during an available time slot via a memory array bus;
receiving, by the media scheduler, the data and a stored error correction code for the data from the memory array via the memory array bus;
sending, by the media scheduler, the received data and error correction code to the memory controller cache; and
determining, by the memory controller cache, that the data includes the correctable error using the error correction code.

14. The method of claim 13, wherein sending the read command for the data includes sending a separate request for the stored error correction code to the memory array via the memory array bus.

15. The method of claim 10, including storing error correction code for data stored in the memory array at a different address than the data.

16. A non-transitory computer readable storage medium comprising instructions configured to cause a memory controller of a memory system to:
decode a memory read request from a requesting device;
obtain read data for the memory read request from a memory array of the memory system according to a memory address;
detect that the read data has a correctable error;
return corrected read data to the requesting device in response to the memory request;
store the corrected read data in a memory controller cache of the memory system and indicate a state of the corrected read data as valid and dirty in response to detecting that the read data has the correctable error; and
determine a cache eviction event and write corrected read data to the memory array in response to the cache eviction event.

17. The non-transitory computer readable storage medium of claim 16, including instructions to cause the memory controller to:
query the memory controller cache in response to the memory read request;
allocate a cache line for the read data when the requested read data is not stored in the memory controller cache and indicate a state of the cache line as invalid; and
change the state of the cache line to valid and dirty in response to detecting that the read data has the correctable error.

18. The non-transitory computer readable storage medium of claim 16, including instructions to cause the memory controller to write the corrected read data to the memory array during a demand scrub operation that corrects data errors in the memory array.

19. The non-transitory computer readable storage medium of claim 16, including instructions to cause the memory controller to:
send the memory read request to a media scheduler of the memory system;
send a request for the read data during an available time slot via a memory array bus;
receive the read data and a stored error correction code for the read data from the memory array via the memory array bus;
send the received read data and error correction code to the memory controller cache; and
determine that the read data includes the correctable error using the error correction code.

20. The non-transitory computer readable storage medium of claim 19, including instructions to cause the memory control unit to send a separate request via the memory array bus to a separate address of the memory array for the stored error correction code.

* * * * *